United States Patent
Jang et al.

(10) Patent No.: US 10,131,361 B2
(45) Date of Patent: Nov. 20, 2018

(54) DETERMINING SPEED INFORMATION

(71) Applicant: HERE Global B.V., Eindhoven (NL)

(72) Inventors: Dongwook Jang, Lisle, IL (US);
Joshua Thompson, Chicago, IL (US);
Gavril Giurgiu, Deerfield, IL (US);
Anton Anastassov, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 31 days.

(21) Appl. No.: 15/164,172

(22) Filed: May 25, 2016

(65) Prior Publication Data
US 2017/0341660 A1 Nov. 30, 2017

(51) Int. Cl.
*B60W 40/105* (2012.01)
*G08G 1/052* (2006.01)
(Continued)

(52) U.S. Cl.
CPC ........ *B60W 40/105* (2013.01); *B60W 30/143* (2013.01); *G05D 1/0088* (2013.01);
(Continued)

(58) Field of Classification Search
CPC .......................... B60W 30/143; B60W 40/105
(Continued)

(56) References Cited

U.S. PATENT DOCUMENTS 6,385,539 B1   5/2002 Wilson et al.
6,804,580 B1*  10/2004 Stoddard ................ B25J 9/1669
                                                       318/568.1

(Continued)

FOREIGN PATENT DOCUMENTS

CN   102540978 A   7/2012
EP   2 180 456 A1  4/2010
(Continued)

OTHER PUBLICATIONS

Short-Term Traffic Speed Forecasting Based on Data Recorded at Irregular Intervals;Qing Ye; W. Y. Szeto; S. C. Wong IEEE Transactions on Intelligent Transportation Systems; Year 2012, vol. 13, issue 4; pp. 1727-1737—IEEE Journals & Magazines.*
(Continued)

*Primary Examiner* — Cuong H Nguyen
(74) *Attorney, Agent, or Firm* — Alston & Bird LLP (57) ABSTRACT

A method is presented, which comprises:
  obtaining or holding available at least one speed profile for at least one selected link of a travel network, wherein said at least one speed profile represents a plurality of speeds for a plurality of subsequent segments of said selected link;
  smoothing said at least one speed profile for said at least one selected link in a first smoothing step by:
    determining whether said at least one speed profile represents one or more speeds that are associated with an acceleration above a predetermined acceleration threshold or a deceleration below a predetermined deceleration threshold;
    for each speed that is determined to be associated with an acceleration above said acceleration threshold or a deceleration below said deceleration threshold, determining a respective adapted speed for replacing said respective speed at least partially based on speeds for one or more adjacent segments of said respective segment.

Further presented are inter-alia corresponding apparatuses, a corresponding system and a corresponding computer program code.

27 Claims, 5 Drawing Sheets

(51) Int. Cl.
  *G05D 1/00* (2006.01)
  *B60W 30/14* (2006.01)
  *G07C 5/08* (2006.01)
  *G08G 1/01* (2006.01)
  *G08G 1/0967* (2006.01)
  *G07C 5/00* (2006.01)

(52) U.S. Cl.
  CPC ........... *G07C 5/0858* (2013.01); *G08G 1/012* (2013.01); *G08G 1/0129* (2013.01); *G08G 1/0141* (2013.01); *G08G 1/052* (2013.01); *G08G 1/096725* (2013.01); *G08G 1/096741* (2013.01); *G08G 1/096775* (2013.01); *G07C 5/008* (2013.01)

(58) Field of Classification Search
  USPC ........................................ 701/119, 23.93, 96
  See application file for complete search history.

(56) References Cited

U.S. PATENT DOCUMENTS

| | | | |
|---|---|---|---|
| 6,850,841 B1 | 2/2005 | Casino | |
| 7,418,346 B2* | 8/2008 | Breed | B60N 2/2863 701/117 |
| 8,005,602 B2* | 8/2011 | Bando | B60T 7/22 340/466 |
| 8,352,111 B2* | 1/2013 | Mudalige | G08G 1/22 340/435 |
| 8,352,112 B2* | 1/2013 | Mudalige | G08G 1/22 340/435 |
| 8,406,939 B2* | 3/2013 | Jackson | G05D 1/101 701/120 |
| 8,494,759 B2* | 7/2013 | Hada | G08G 1/0112 701/117 |
| 8,615,361 B2 | 12/2013 | Papajewski et al. | |
| 8,676,466 B2* | 3/2014 | Mudalige | G08G 1/22 370/252 |
| 8,983,778 B2* | 3/2015 | McCarthy | G06T 15/005 701/532 |
| 9,053,632 B2 | 6/2015 | Shen et al. | |
| 9,240,123 B2 | 1/2016 | Stenneth | |
| 9,755,850 B2 | 9/2017 | Stolfus | |
| 9,785,145 B2* | 10/2017 | Gordon | G05D 1/0061 |
| 9,880,019 B2* | 1/2018 | McCarthy | G06T 15/005 |
| 9,958,283 B2* | 5/2018 | Anastassov | G01C 21/3492 |
| 2004/0172189 A1 | 9/2004 | Maeda | |
| 2006/0095195 A1* | 5/2006 | Nishimura | B60W 30/025 701/96 |
| 2006/0262662 A1 | 11/2006 | Jung et al. | |
| 2007/0192013 A1* | 8/2007 | Bando | B60T 7/22 701/93 |
| 2008/0046165 A1 | 2/2008 | Downs et al. | |
| 2008/0294331 A1 | 11/2008 | Fushiki et al. | |
| 2010/0256835 A1* | 10/2010 | Mudalige | G08G 1/163 701/2 |
| 2011/0153166 A1 | 6/2011 | Yester | |
| 2011/0307165 A1 | 12/2011 | Hiestermann et al. | |
| 2012/0059535 A1* | 3/2012 | Jackson | G05D 1/101 701/3 |
| 2012/0059574 A1* | 3/2012 | Hada | G08G 1/0112 701/119 |
| 2012/0095682 A1 | 4/2012 | Wilson | |
| 2012/0209505 A1* | 8/2012 | Breed | G01C 21/3697 701/409 |
| 2012/0283942 A1 | 11/2012 | T'Siobbel et al. | |
| 2013/0021382 A1 | 1/2013 | Morlock et al. | |
| 2013/0275033 A1 | 10/2013 | Bastiaensen et al. | |
| 2013/0282264 A1 | 10/2013 | Bastiaensen et al. | |
| 2013/0297196 A1* | 11/2013 | Shida | B60W 30/143 701/119 |
| 2013/0311076 A1 | 11/2013 | Mieth et al. | |
| 2014/0149028 A1 | 5/2014 | Chapman et al. | |
| 2014/0278052 A1 | 9/2014 | Slavin et al. | |
| 2014/0288811 A1* | 9/2014 | Oura | G08G 1/0116 701/119 |
| 2014/0289267 A1 | 9/2014 | Felix et al. | |
| 2014/0297182 A1 | 10/2014 | Casson et al. | |
| 2015/0006069 A1* | 1/2015 | Kwon | G08G 1/052 701/119 |
| 2015/0100216 A1 | 4/2015 | Rayes | |
| 2015/0120174 A1 | 4/2015 | Lewis | |
| 2015/0300825 A1 | 10/2015 | Manoliu et al. | |
| 2015/0345971 A1 | 12/2015 | Meuleau et al. | |
| 2016/0223348 A1 | 8/2016 | Witte et al. | |
| 2017/0032667 A1 | 2/2017 | Fowe et al. | |
| 2017/0341660 A1 | 11/2017 | Jang et al. | |

FOREIGN PATENT DOCUMENTS

| | | |
|---|---|---|
| WO | WO 2014/091982 A1 | 6/2014 |
| WO | WO-2015/145637 A1 | 10/2015 |

OTHER PUBLICATIONS

"Acceleration smoothing", Smoothing results—R&D Traffic Technologies Group (TTG)—HERE Confluence Wiki, Retrieved on Sep. 28, 2016, Webpage available at : https://confluence.in.here.com/display/PDOD/Smoothing+results. (year: 2016).*

Jun et al., "Smoothing Methods to Minimize Impact of Global Positioning System Random Error on Travel Distance, Speed, and Acceleration Profile Estimates", Journal of the Transportation Research Board, 1972, p. 141-150. (year: 1972).*

Villagra et al., "Smooth Path and Speed Planning for an Automated Public Transport Vehicle", Robotics and Autonomous Systems, vol. 60, No. 2, Feb. 2012, pp. 252-265. (year: 2012).*

Office Action for U.S. Appl. No. 15/163,963 dated Aug. 30, 2017.

Ou et. al, A Theoretical Framework for Traffic Speed Estimation by Fusing Low-resolution Probe Vehicle Data, IEEE Transactions on Intelligent Transportation Systems, vol. 12, No. 3, Sep. 2011, pp. 747-756.

Tong et al., "Traffic Information Deriving Using GPS Probe Vehicle Data Integrated With GIS", Center for Urban and Regional Analysis and Department of Geography, Nov. 17, 2005, 24 pages.

Aguilera et al., "A New Kind of Fundamental Diagram with an Application to Road Traffic Emission Modelling", Journal of advanced transporation, vol. 48, 2014, pp. 1-23.

"Acceleration smoothing", Smoothing results—R&D Traffic Technologies Group (TTG)—HERE Confluence Wiki, Retrieved on Sep. 28, 2016, Webpage available at : https://confluence.in.here.com/display/PDOD/Smoothing+results.

"Smoothing Spline", Wikipedia, Retrieved on Sep. 28, 2016, Webpage available at : https://en.wikipedia.org/wiki/Smoothing_spline.

Duran et al., "GPS Data Filtration Method for Drive Cycle Analysis Applications", SAE Technical Paper, Apr. 16, 2012, 6 Pages.

Villagra et al., "Smooth Path and Speed Planning for an Automated Public Transport Vehicle", Robotics and Autonomous Systems, vol. 60, No. 2, Feb. 2012, pp. 252-265.

Jun et al, "Smoothing Methods to Minimize Impact of Global Positioning System Random Error on Travel Distance, Speed, and Acceleration Profile Estimates", Journal of the Transportation Research Board, 1972, p. 141-150.

Labakhua et al., "Smooth Trajectory Planning for Fully Automated Passengers Vehicles", In informatics in control, automation and robotics III, 2007, 8 pages.

"Local Polynomial Regression Fitting", Stat.ethz.ch/R-manual, Retrieved on Sep. 27, 2016, Webpage available at : https://stat.ethz.ch/R-manual/R-devel/library/stats/html/loess.html.

"Scatter Plot Smoothing", Stat.ethz.ch/R-manual, Retrieved on Oct. 19, 2016, Webpage available at : https://stat.ethz.ch/R-manual/R-devel/library/stats/html/lowess.html.

"Fit a Smoothing Spline", Stat.ethz.ch/R-manual, Retrieved on Oct. 19, 2016, Webpage available at : https://stat.ethz.ch/R-manual/R-devel/library/stats/html/smooth.spline.html.

"Friedman's SuperSmother", Stat.ethz.ch/R-manual, Retrieved on Sep. 27, 2016, Webpage available at : https://stat.ethz.ch/R-manual/R-patched/library/stats/html/supsmu.html.

(56) References Cited

OTHER PUBLICATIONS

"Rolling Means/Maximums/Medians /Sums", R project, Retrieved on Sep. 27, 2016, Webpage available at : http://search.r-project.org/library/zoo/html/rollmean.html.
"The R Project for Statistical Computing", R project, Retrieved on Sep. 27, 2016, Webpage available at : https://www.r-project.org.
International Search Report and Written Opinion from International Patent Application No. PCT/EP2017/062633, dated Sep. 13, 2017, 15 pages.
Extended European Search Report for European Patent Application No. 17172827.2 dated Oct. 4, 2017, 4 pages.
Office Action for U.S. Appl. No. 15/164,096 dated Jan. 10, 2018, 20 pages.
Office Action for U.S. Appl. No. 15/164,058 dated Jan. 12, 2018, 33 pages.
Office Action for U.S. Appl. No. 15/366,254 dated Jan. 17, 2018, 24 pages.
Office Action for U.S. Appl. No. 15/366,254 dated Jul. 6, 2018, 5 pages.
Office Action for U.S. Appl. No. 15/164,058 dated Jul. 13, 2018.
Office Action for U.S. Appl. No. 15/164,096 dated May 17, 2018.
Office Action for U.S. Appl. No. 15/164,096 dated Oct. 5, 2018.
Advisory Action for U.S. Appl. No. 15/164,058 dated Sep. 19, 2018.

\* cited by examiner

DETERMINING SPEED INFORMATION

FIELD

The invention relates to the field of determining speed information and more specifically to determining speed information (e.g. one or more smoothed speed profiles) for a vehicle (e.g. for autonomous vehicles, highly-assisted-driving vehicles and/or vehicles with predictive cruise control).

BACKGROUND

There have been multiple recent developments in the transportation technology that are revolutionizing the way people experience driving. Such technologies include connected vehicles with mobile access to the internet, adaptive cruise control or autonomous navigation and platooning. Adaptive cruise control systems automatically change the vehicle speed to accommodate curves, traffic congestions or road incidents. Autonomous vehicles take a step farther by taking control not only of the vehicle speed but also of the wheel steering, when turning or changing lanes, with the ultimate goal of taking full control of the whole driving process and thus enabling drivers to become passengers, with all the benefits associated with being relieved from the task of driving. Finally, platooning of multiple trucks would save energy, reduce $CO_2$ emissions and reduce the strain of human drivers. Platooning could open new avenues not only in the trucking industry but also for consumers by releasing the drivers from the task of maneuvering the vehicles. In such platoons the lead vehicle drives either manually or autonomously, followed by vehicles without autonomous driving capacity, in which the drivers become passengers.

SUMMARY OF SOME EMBODIMENTS OF THE INVENTION

In all of the three cases described above, adaptive cruise control, autonomous navigation and platooning, it is conceivable that the vehicles would benefit from using the collective knowledge accumulated from other traffic participants such as human and/or robotic driving experiences. An important quantity that defines the motion of a vehicle is the speed. Traffic participants travel at different speeds on a given link such as a road section. The distribution of these speeds on the link may be characterized by one or more statistical distribution descriptors, including, but not limited to, mean speed, median speed, other speed percentiles, and various measures of the distribution width and shape. The evolution of one or more of these descriptors along a link may be understood to be represented by a speed profile. For example, a median speed profile may represent one or more speeds along the link such that half of the vehicles travel slower, and the other half travel at higher speeds. The speed profiles may be created with high spatial granularity along the link. Such speed profiles can be used by predictive cruise control and autonomous vehicles to provide a human-like driving experience.

According to an exemplary aspect of the invention, a method is presented, which comprises:
  obtaining or holding available at least one speed profile for at least one selected link of a travel network, wherein the at least one speed profile represents a plurality of speeds for a plurality of subsequent segments of the selected link;
  smoothing the at least one speed profile for the at least one selected link in a first smoothing step by:
    determining whether the at least one speed profile represents one or more speeds that are associated with an acceleration above a predetermined acceleration threshold or a deceleration below a predetermined deceleration threshold;
    for each speed that is determined to be associated with an acceleration above the acceleration threshold or a deceleration below the deceleration threshold, determining a respective adapted speed for replacing the respective speed at least partially based on one or more speeds for one or more adjacent segments of the respective segment.

The presented method may be performed by an apparatus or by a plurality of apparatuses. For example, the presented method may be performed by any one embodiment of the below presented apparatuses. Alternatively or additionally, the presented method may be performed by a plurality of any one embodiment of the below presented apparatuses.

Holding available the at least one speed profile for at least one selected link of a travel network may be understood to mean that the at least one speed profile is stored in memory means of the apparatus performing the method. Example of memory means include a volatile memory and a non-volatile memory. Alternatively or additionally, the at least one speed profile could be obtained by determining the at least one speed profile or by receiving the at least one speed profile, for example by a communication interface of the apparatus performing the presented method.

A link may be a section of the travel network, for example a section between two junctions of the travel network. A link may be a directional link (i.e. only relating to one travel direction on the link) or a non-directional link (relating to more than one travel direction on the link). Each link may be associated with a link identifier (e.g. a unique link identifier). The at least one selected link could be such a link of the travel network, for example an arbitrary link of the travel network.

For example, the selected link may be divided into the plurality of subsequent segments. This may enable a high spatial granularity of the speed profile. Each of the segments may have the same length (e.g. 10 m). Alternatively the segments may have at least partially different length.

Each of the plurality of speeds of the at least one speed profile for the selected link may be a speed for a respective segment of the plurality of subsequent segments of the selected link.

For example, the selected link may be divided into a plurality of n subsequent segments S which may be expressed as follows by way of example: $S_1, \ldots S_{i-1}, S_i, S_{i+1}, \ldots S_n$. The plurality of speeds of the speed profile may comprise for each segment of the plurality of n subsequent segments a respective speed v which may be expressed as follows by way of example: $v_1, \ldots v_{i-1}, v_i, v_{i+1}, \ldots v_n$, wherein speed $v_{i-1}$ is for segment $S_{i-1}$, speed $v_i$ is for segment $S_i$, speed $v_{i+1}$ is for segment $S_{i+1}$, and so forth.

A speed profile for the selected link may be understood to represent speed information, for example speed information for a vehicle. The speed profile may for example be a link-specific speed profile or a potential travel path-specific speed profile. A link-specific speed profile may be understood to be a speed profile for the selected link representing speed information for all vehicles travelling on the selected link (irrespective of the travel of the vehicles). A potential travel path-specific speed profile may be understood to be a speed profile for a potential travel path of the selected link representing speed information only for vehicles travelling on the selected link on a travel route including the potential travel path.

The at least one speed profile may be part of a plurality of speed profiles, for example a plurality of speed profiles for links of the travel network.

A speed for a segment of the plurality of subsequent segments of the selected link represented by the at least one speed profile may be determined to be associated with an acceleration above a predetermined acceleration threshold, if an acceleration between this speed and the speed for the previous segment for a given acceleration distance (e.g. the length of the segment) is above the predetermined acceleration threshold. Similarly, a speed for a segment of the plurality of subsequent segments of the selected link represented by the at least one speed profile may be determined to be associated with an deceleration below a predetermined deceleration threshold, if a deceleration between this speed and the speed for the previous segment for a given deceleration distance (e.g. the length of the segment) is below the predetermined deceleration threshold. Therein, the previous segment may be the previous segment of the plurality of segments of the selected link or the previous segment of a link previous to the selected link. The latter case may for example enable to smooth the transition between two speed profiles for two subsequent links of the travel network.

In case the absolute value of the predetermined acceleration threshold and the predetermined deceleration threshold is equal, a speed for a segment of the plurality of subsequent segments of the selected link represented by the at least one speed profile may be determined to be associated with an acceleration above a predetermined acceleration threshold, if an absolute value of the acceleration between this speed and the speed for the previous segment is above the predetermined acceleration threshold. This condition may be expressed for speed $v_i$ for segment $S_i$ associated with an acceleration $a_i$ and an acceleration threshold $a_{threshold}$ as follows by way of example:

$$|a_i| > a_{threshold}.$$

An example predetermined acceleration threshold may be 0.3 g, 0.6 g or 0.8 g; and an example predetermined deceleration threshold may be −0.3 g, −0.6 g or −0.8 g (with g describing the standard value of the gravitational acceleration, i.e. 9.80665 m/s2).

For determining a respective adapted speed for replacing a respective speed that is determined to be associated with an acceleration above the acceleration threshold or a deceleration below the deceleration threshold, one or more speeds for one or more adjacent segments of the respective segment (i.e. the segment for which the respective speed is) may be used. Therein, the one or more adjacent segments may be one or more adjacent segments of the plurality of segments of the selected link and/or one or more adjacent segments of a link adjacent to the selected link represented. In the first case, the one or more speeds may be represented by the at least one speed profile, and in the latter case, the one or more speeds may be represented by another speed profile. The latter case may also enable to smooth the transition between two speed profiles for two subsequent links of the travel network.

By determining, for each speed that is determined to be associated with an acceleration above the acceleration threshold or a deceleration below the deceleration threshold, a respective adapted speed for replacing the respective speed at least partially based on speeds for one or more adjacent segments of the respective segment, strong accelerations and decelerations may be minimized.

Furthermore, the smoothing may comprise in the first smoothing step replacing, each speed that is determined to be associated with an acceleration above the acceleration threshold or a deceleration below the deceleration threshold, by the respective adapted speed for replacing the respective speed.

As a result of the first smoothing step a first smoothed speed profile may be obtained in which each speed that is determined to be associated with an acceleration above the acceleration threshold or a deceleration below the deceleration threshold is replaced by a respective adapted speed.

As a result of the smoothing a smoothed speed profile may be obtained. The smoothed speed profile may correspond to the first smoothed speed profile.

The presented method may be for determining speed information, for example for determining speed information for a vehicle.

According to a further exemplary aspect of the invention, an apparatus is presented, which comprises means for performing, at least in part, the steps of any one embodiment of the presented method.

The means of the presented apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus may comprise a single means for all functions, a common plurality of means for all functions, or a plurality of different means for different functions.

According to a further exemplary aspect of the invention, another apparatus is presented, which comprises at least one processor and at least one memory including computer program code, the at least one memory and the computer program code with the at least one processor configured to cause the apparatus at least to perform, at least in part, the steps of any one embodiment of the presented method.

The presented apparatuses may be modules or components for a device, for example chips. Alternatively, the presented apparatuses may be devices. The presented apparatuses may comprise only the disclosed components (e.g. means) or may further comprise one or more additional components.

The presented apparatuses may be for determining speed information, for example for determining speed information for a vehicle.

The presented apparatuses may be or may be part of one of a server, a stationary device, a module for a device, a vehicle or an embedded navigation device of a vehicle.

According to a further exemplary aspect of the invention, a system is presented which comprises a plurality of apparatuses which are configured to perform, together, the steps of any one embodiment of the presented method. The apparatuses of the presented system may at least partially correspond to any one of the presented apparatuses according to an exemplary aspect of the invention. For example, the presented system may comprise a server or a server cloud for determining speed information for a vehicle and a vehicle.

According to a further exemplary aspect of the invention, a non-transitory computer readable storage medium is presented, in which computer program code is stored. The computer program code causes at least one apparatus to perform the steps of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is presented, the computer program code when executed by a processor causing an apparatus to perform the steps of any one embodiment of the presented method.

In the following, further features and embodiments of these exemplary aspects of the invention will be described.

According to an exemplary embodiment of the invention, the method further comprises obtaining or holding available map data representing, at least in part, the travel network.

Holding available the map data may be understood to mean that the map data are stored in memory means of the apparatus performing the method. Example of memory means include a volatile memory and a non-volatile memory. Alternatively or additionally, the map data could be obtained by determining the map data or by receiving the map data, for example by a communication interface of the apparatus performing the presented method.

The map data may represent the travel network at least in part by representing a map of at least a part of the travel network.

According to an exemplary embodiment of the invention, the travel network is a road network. Accordingly, a link of the travel network represented by the map data may be understood to be a road section of the road network, for example a road section between two junctions of the road network.

According to an exemplary embodiment of the invention, the respective adapted speed for replacing the respective speed is determined by one of:
 calculating a mean speed of the one or more speeds for the one or more adjacent segments,
 calculating a weighted mean speed of the speeds for the one or more adjacent segments and the respective segment.

In calculating a mean speed of the speed for the one or more adjacent segments, the speed for the segment previous to the respective segment and the speed for the segment subsequent to the respective segment may be used. This may be expressed as follows:

$$v_{i,mean} = \frac{(v_{i-1} + v_{i+1})}{2}$$

with mean speed $v_{i,mean}$ for the respective segment $S_i$, speed $v_{i-1}$ for the previous segment $S_{i-1}$ and speed $v_{i+1}$ for the subsequent segment $S_{i+1}$. The mean speed (e.g. $v_{i,mean}$) may be used as respective adapted speed for replacing the respective speed (e.g. $v_i$) for the respective segment (e.g. $S_i$), if the respective speed (e.g. $v_i$) is determined to be associated with an acceleration (e.g. $a_i$) above the acceleration threshold (e.g. $a_{threshold}$) or a deceleration below the deceleration threshold.

In calculating a weighted mean speed of the speeds for the one or more adjacent segments and the respective segment, a weighting factor may be used for weighting the speeds for the one or more adjacent segments and the respective segment when calculating the weighted mean speed. The weighting factor may depend on the acceleration or deceleration associated with the respective speed that is determined to be associated with an acceleration above the acceleration threshold or a deceleration below the deceleration threshold.

An example weighting factor $\beta$ for speed $v_i$ for segment $S_i$ associated with an acceleration a and an acceleration threshold $a_{threshold}$ may be determined as follows:

$$\beta = \left(\frac{a_{threshhold} - |a_i|}{a_{threshhold}}\right)^q$$

with q as an adjustable parameter, for example q=1.

The weighted mean speed $v_{i,weighted\ mean}$ may then be calculated as follows:

$$v_{i,weighted\ mean} = \frac{[(1-\beta)v_{i-1} + \beta v_i + (1-\beta)v_{i+1}]}{\beta + 2(1-\beta)}$$

with weighted mean speed $v_{i,weighted\ mean}$ for the respective segment $S_i$, speed $v_{i-1}$ for the previous segment $S_{i-1}$ and speed $v_{i+1}$ for the subsequent segment $S_{i+1}$. The mean speed (e.g. $v_{i,weighted\ mean}$) may be used as respective adapted speed for replacing the respective speed (e.g. $v_i$) for the respective segment (e.g. $S_i$), if the respective speed (e.g. $v_i$) is determined to be associated with an acceleration (e.g. $a_i$) above the acceleration threshold (e.g. $a_{threshold}$) or a deceleration below the deceleration threshold.

According to an exemplary embodiment of the invention, the smoothing further comprises in a second smoothing step:
 applying one or more additional smoothing techniques on at least one speed profile obtained as a result of the first smoothing step.

For example, on a first smoothed speed profile obtained as a result of the first smoothing step one or more additional smoothing techniques are applied. This may have the effect that the result of the first smoothing step is further improved.

The one or more additional smoothing techniques may be statistical smoothing techniques, for example one of the following smoothing techniques:
 locally weighted scatterplot smoothing;
 smoothing spline;
 Friedman's super smoother;
 rolling mean;
 rounded splines.

For implementing these smoothing techniques, the "R" software of the R Project for Statistical Computing may be used at least in part. R is a free software environment for statistical computing and graphics. It is presently available from https://www.r-project.org.

Locally weighted scatterplot smoothing techniques are "LOESS" and "LOWESS" which are two strongly related non-parametric regression methods that combine multiple regression models in a k-nearest-neighbor-based meta-model. Documentation for using the LOESS function of R is presently available from https://stat.ethz.ch/R-manual/R-devel/library/stats/html/loess.html, and documentation for using the LOWESS function of R is presently available from https://stat.ethz.ch/R-manual/R-devel/library/stats/html/lowess.html.

Smoothing spline is a smoothing technique of fitting a smooth curve to a set of noisy observations using a spline function (cf. https://en.wikipedia.org/wiki/Smoothing_spline). Documentation for using the smoothing spline function of R is presently available from https:i/stat.ethz.ch/R-manuaLR-devel/library/stats/html/smooth.spline.html. The smoothing parameter λ=0.5 may be used.

Friedman's super smoother is a nonparametric regression estimator based on local linear regression with adaptive bandwidths. Documentation for using the Friedman's super smoother function of R is presently available from https://stat.ethz.ch/R-manual/R-patched/library/stats/html/supsmu.html. The smoothing parameter span=4/npoints may be used.

For the rolling mean smoothing techniques, for example the mean speed for a center segment may be determined based on one or more speeds for one or more adjacent segments. For example, speeds for three segments on the left side and speeds for three segments on the right side may be used for determining the mean speed for the center segment. The speed for the center segment may be omitted. Documentation for using the rolling mean function of R is presently available from http://search.r-project.org/library/zoo/html/rollmean.html.

For the rounded splines smoothing technique, the speeds obtained as results from the smoothing spline technique may be rounded to the multiple of M (e.g. M=5).

As a result of the second smoothing step a second smoothed speed profile may be obtained. The smoothed speed profile which may be obtained by the smoothing may correspond to this second smoothed speed profile.

According to an exemplary embodiment of the invention, the first smoothing step and/or the second smoothing are repeated at least twice. By repeating the first smoothing step and/or the second smoothing, an occasionally increase of the acceleration for a given speed due to the first run of the first smoothing step and/or the second smoothing may be smoothed.

According to an exemplary embodiment of the invention, in the first smoothing step and/or the second smoothing step one or more further speed profiles for one or more links adjacent to the selected link are at least partially considered.

For example, the selected link and the one or more links adjacent to the selected link represent three or more subsequent links of the travel network. This may have the effect that the at least one first and second smoothed speed profile maintain the smoothness at the transition to the adjacent links.

For example, the selected link and the one or more links adjacent to the selected link may at least partially define a potential travel path for the at least one selected link. A potential travel path for the at least one selected link may be at least partially defined by an incoming link of the travel network and an outgoing link of the travel network that are linked by the selected link and a direction of travel from the incoming link to the outgoing link on the selected link.

A potential travel path of the selected link may be uniquely defined by specifying the selected link, an incoming link and an outgoing link and, optionally, a direction of travel on the selected link, the incoming link and the outgoing link. For example, each link may be specified by a link identifier. The direction of travel may correspond to the direction from the incoming link through the selected link to the outgoing link and, thus, may for example be derivable from the specification of the incoming link and the outgoing link. It may thus not be necessary to specify the direction of travel for defining a potential travel path of the selected link.

An incoming link may be understood to be a link adjacent to the selected link through which the selected link may be entered, and an outgoing link may be understood to be a link adjacent to the selected link through which the selected link may be exited.

Generally, for a selected link having N incoming links and M outgoing links, there exist N×M potential travel paths.

Accordingly, each potential travel of the selected link may represent a specific option for entering the at least one selected link and for exiting the at least one selected link and, thus, each potential travel path of the plurality of potential travel paths may have different features (e.g. a different course).

Alternatively or additionally, the selected link and the one or more links adjacent to the selected link may be part of a travel route for at least one vehicle. By performing the smoothing and/or the presented method for each link as selected link which is included in the travel route, smoothed speed profiles and smoothed transitions between the speed profiles for the entire travel route may be obtained.

According to an exemplary embodiment of the invention, the at least one speed profile for the selected link of the travel network is determined at least partially based on speeds represented by a plurality of probe data points of one or more probe data sets of a plurality of probe data sets. The one or more probe data sets of a plurality of probe data sets may be associated with the at least one selected link.

The plurality of probe data sets may comprise at least two probe data sets, more specifically at least three probe data sets. For example, the plurality of probe data sets may comprise more than 1000 probe data sets.

The plurality of probe data points may comprise at least two probe data points, more specifically at least three probe data points. For example, the plurality of probe data points may comprise more than 100 probe data points.

Each probe data point of the plurality of probe data points may represent a position and a speed, for example a position of a mobile device and a speed of this mobile device at this position. Examples of such a mobile device may be a vehicle, a navigation device and/or a smartphone.

The position may be a position associated with a position captured by the mobile device. For example, the position may be a Global Navigation Satellite System (GNSS) position captured by a GNSS sensor of the mobile device. Alternatively or additionally, the position may be a map matched GNSS position representing a GNSS position captured by a GNSS sensor of the mobile device that has been matched to the travel network represented by the map data.

The speed may be associated with a speed captured by the mobile device. Alternatively or additionally, the speed may be determined at least partially based on one or more positions captured by the mobile device, for example by calculating the speed based on the distance between two positions captured by the mobile device and the time difference between capturing these two positions.

For example, in determining a speed profile for the selected link only probe data sets may be used that are associated with the selected link. Each probe data set of the plurality of probe data points may comprise a sequence of probe data points representing a position and a speed of a specific mobile device.

This may have the effect that a probe data set of the plurality of probe data sets and the probe data points of this probe data set of the plurality of probe data sets may be associated with a travel route of a specific mobile device. For example, the probe data points of the probe data set represent positions and speeds of the specific mobile device when travelling along this travel route. Each of these probe data sets may thus be considered to represent historic experiences of human drivers travelling along this travel route. A considerable amount of such probe data sets has been collected by service providers over time and this plurality of (historic) probe data sets can be used for determining speed profiles. To avoid a falsification of the speed profiles due to traffic congestions, only probe data sets collected during weekends and during night, from 8 pm to 7 am, during business days may be used for determining speed profiles.

A probe data set may be understood to be associated with the selected link if the probe data set is associated with a travel route of a specific mobile device including the selected link. This may have the effect that a speed profile for the selected link is determined based on one or more probe data points representing one or more speeds and positions of specific mobile devices which were travelling along a travel route including the selected link.

Each probe data point of a specific probe data set may comprise the identifier of the probe data set. The identifier may be indicative for a session of a service provider collecting probe data sets of a mobile device, a mobile device, or a combination thereof.

The speed profile for the at least one selected link may be at least partially determined by calculating one or more mean speeds, one or more speed percentiles or one or more combinations thereof for one or more subsequent segments of the selected link.

For example, this calculating is at least partially based on one or more speeds represented by one or more probe data points of the plurality of respective probe data points of the one or more respective probe data sets associated with the selected link. These one or more probe data points may represent positions on the selected link, for example on the one or more subsequent segments of the selected link.

Examples of calculated speed percentiles are a 10% speed percentile, a 25% speed percentile, a 30% speed percentile, a 50% speed percentile (i.e. the median speed), a 70%/speed percentile, a 75% speed percentile, a 90% speed percentile or combinations thereof.

For example, for determining a speed profile representing a plurality of speeds for a plurality of subsequent segments of the selected link, for each segment of the subsequent segments, a mean speed or a weighted speed percentile may be calculated based on probe data points representing a position on the respective segment.

For example, different speed profiles for a potential travel path could be determined for vehicles transporting human passengers (which have to account for the passenger comfort) and for vehicles transporting only goods or traveling empty to pick up passengers. In the latter case, without the constraints related to the human comfort, it is conceivable that autonomous vehicles would drive much faster than the ones driven by humans, while still maintaining the highest safety standards. For speed profiles for vehicles transporting human passengers for example the 50% speed percentile (i.e. the median speed) or the 70% speed percentile may be used, and for speed profiles for vehicles transporting only goods or traveling empty to pick up passengers for example the 75% speed percentile or the 90% speed percentile may be used.

Such speed profiles determined by calculating one or more mean speeds or one or more speed percentiles may be affected by statistical fluctuations which may be minimized by the smoothing of the presented method.

According to an exemplary embodiment of the invention, the method further comprises providing or generating speed map data representing an association of map data and a plurality of speed profiles for links of the travel network, the plurality of speed profiles comprising at least one smoothed speed profile obtained as a result of the smoothing.

According to an exemplary embodiment of the invention, the presented method further comprises:
  determining speed information for at least one vehicle;
  providing the speed information to the at least one vehicle.

For example, the at least one vehicle may request speed information for a travel route from an apparatus performing the presented method (e.g. a server, e.g. a server of the presented system). The request may specify the links (e.g. by link identifiers) and/or potential travel paths (e.g. by specifying the links at least partially defining the potential travel paths) included in the travel route.

The travel route may have been determined by the vehicle based on map data obtained or hold available by the at least one vehicle. Alternatively or additionally, the travel route may have been determined by a server (e.g. a server of the presented system) for the vehicle. Determining the travel route information may be at least partially based on a starting position and a destination position. For example, the starting position may represent the current position of the vehicle and the destination position may represent a position of a desired destination of a user of the vehicle. The starting position and the destination position may be obtained by the at least one vehicle, for example by capturing the current position of the vehicle by a GNSS sensor and/or by receiving a user input on a user interface of the vehicle.

The speed information for the at least one vehicle may be determined to represent the speed profiles for the links that are included in the travel route. For example, the speed information may at least partially represent at least one smoothed speed profile for the at least one selected link obtained as a result of the smoothing.

For example, the speed information may be at least partially based on at least one smoothed speed profile obtained as a result of the smoothing. Alternatively or additionally, the smoothing and/or the presented method may be performed for at least one speed profile for at least one link that is included in the travel route, for example it may be performed for each link as selected link which is included in the travel route.

Providing the speed information to the at least one vehicle may be understood to mean that the speed information are communicated or caused to be communicated to the at least one vehicle by an apparatus performing the presented method (e.g. by a server, e.g. a server of the presented system), for example by a communication interface of the apparatus. Alternatively or additionally, the speed information may be provided for use by the at least one vehicle, for example, for, at least in part, autonomously driving along the travel route. The speed information may cause the at least one vehicle to at least partially control and/or adapt its speed accordingly when driving along the route represented by the travel route information.

For example, the at least one vehicle may be, at least in part, an autonomous vehicle, a highly-assisted-driving vehicle, a vehicle with predictive cruise control, or a combination thereof. In certain embodiments of the invention, the vehicle may determine the speed information. Alternatively or additionally, the speed information may be determined by a server and communicated by the server to the vehicle.

According to an exemplary embodiment of the invention, the presented method is performed for a plurality of links of the travel network as selected link. This may be understood to mean that the steps of the presented method may be performed (e.g. repeated) for further links of the plurality of links of the travel network as selected link and for respective speed profiles for these further links.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

The following description serves to deepen the understanding of the present invention and shall be understood to complement and be read together with the description of example embodiments of the invention as provided in the above SUMMARY section of this specification.

By way of example, considering an autonomous vehicle driving in free flow conditions, the autonomous vehicle equipped with high performance sensors and sufficient computing power continuously scans the environment and decides, in real time, the optimal driving speed, taking into consideration multiple road factors such as speed limit, slope, curvature, number of lanes or lane widths. As these factors change along the road, the vehicle may continuously adapt the speed to a value which is optimal from the points of view of both safety and, if humans are transported by the vehicle, driver/passenger comfort. While the vehicle may be able to perform such computations in real time and to adopt the optimal speed based on sensor data only, such computations may be aided by "prior" knowledge for example provided by travel route information representing the current travel route of the vehicle and speed information representing speed profiles for the current travel route of the vehicle. For example, the vehicle could be configured to adapt the vehicle speed by default according to the speed information, while the final decision regarding the speed would be taken based on the information collected by the real time sensors. Since the vehicle may be already in the most probable state according to the historical experience of other drivers encoded in the speed profile, the real time changes dictated by the sensor observations would be minimal and only needed when deviations from the historical norm are observed. Such deviations may be expected in many cases which include recurring traffic congestion associated with the normal business hours and non-recurring congestion due to adverse weather conditions or incidents. The difference between an autonomous vehicle driving with and without this prior knowledge may be thought as analogous to the difference between a human driving in a familiar or un-familiar area. The same as the human driver is required to focus harder to understand the surroundings and navigate in an un-familiar area, the same way, an autonomous vehicle is expected to require more sensor information and computational power when driving without any prior knowledge.

Autonomous vehicles and vehicles equipped with predictive control can thus benefit from having available speed profiles or speed map data which provides typical driving speeds on every link with high spatial granularity. Such speed profiles can be used by predictive cruise control and autonomous vehicles to provide a human-like driving experience. However, such speed profiles may be affected by statistical fluctuations resulting in strong accelerations and decelerations. Furthermore, they may not allow a smooth transition from one speed profile to another speed profile.

Figure 1A:
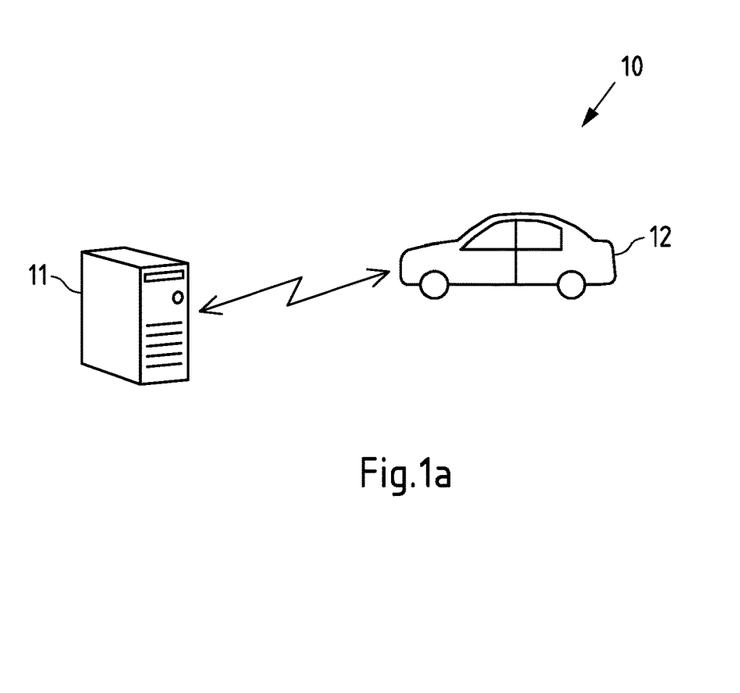
FIG. 1a is a block diagram of an exemplary embodiment of a system according to the invention.

FIG. 1a is a schematic high-level block diagram of a system 10 according to an exemplary aspect of the invention. System 10 comprises a server 11, which may alternatively be embodied as a server cloud (e.g. a plurality of servers connected e.g. via the internet and providing services at least partially jointly), and a vehicle 12.

According to exemplary embodiments of the present invention, server 11 may determine speed information for vehicle 12.

Vehicle 12 may be, at least in part, an autonomous vehicle, a highly-assisted-driving vehicle, a vehicle with predictive cruise control, or a combination thereof.

Communication between server 11 and vehicle 12 may for example take place at least partially in a wireless fashion, e.g. based on cellular radio communication or on Wireless Local Area Network (WLAN) based communication, to name but a few examples. In this way, mobility and connectivity of vehicle 12 is guaranteed.

Figure 1B:
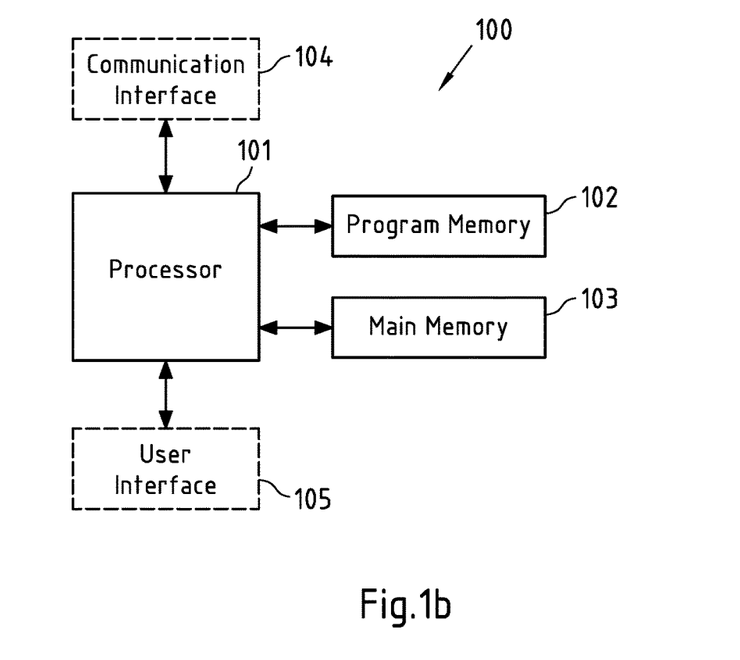
FIG. 1b is a block diagram of an exemplary embodiment of an apparatus according to the invention.

FIG. 1b is a block diagram of an apparatus 100 according to an exemplary aspect of the invention. Apparatus 100 may for example represent server 11 of system 10. Alternatively or additionally, apparatus 100 may for example represent an embedded navigational device of vehicle 12 of system 10.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform one or more of the embodiments of a method (or parts thereof) according to the invention (as for instance further described below with reference to FIGS. 2a and 2b), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a first memory portion that is fixedly installed in apparatus 100, and a second memory portion that is removable from apparatus 100, for instance in the form of a removable SD memory card.

Main memory 103 may for instance be a volatile memory. It may for instance be a DRAM memory, to give non-limiting example. It may for instance be used as a working memory for processor 101 when executing an operating system and/or programs.

Processor 101 further controls an optional communication interface 104 configured to communicate with other devices (e.g. with server 11 or vehicle 12), for example by receiving and/or sending data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the invention, communication interface 104 is inter alia configured to allow communication based on a 2G/3G/4G/5G cellular radio communication and/or a non-cellular radio communication, such as for instance a WLAN communication. Alternatively or additionally, the communication may equally well be based on a wirebound communication connection or a combination of wireless and wirebound communication connections. Accordingly, the communication interface 104 may thus comprise circuitry such as modulators, filters, mixers, switches to allow a wirebound transmission and/or reception of signals. In embodiments of the invention, communication interface 104 is inter alia configured to allow communication based on an Ethernet communication such as a LAN (Local Area Network) communication.

Processor 101 further controls an optional user interface 105 configured to present information to a user of apparatus 100 and/or to receive information from such a user. User interface 105 may for instance be the standard user interface via which a user of apparatus 100 controls other functionality thereof. Examples of such a user interface are a touch-sensitive display, a keyboard, a touchpad, a display, etc.

The components 102-105 of apparatus 100 may for instance be connected with processor 101 by means of one or more serial and/or parallel busses.

It is to be understood that apparatus 100 may comprise various other components (e.g. a positioning sensor such as a Global Navigation Satellite System (GNSS) sensor).

Figure 2A:
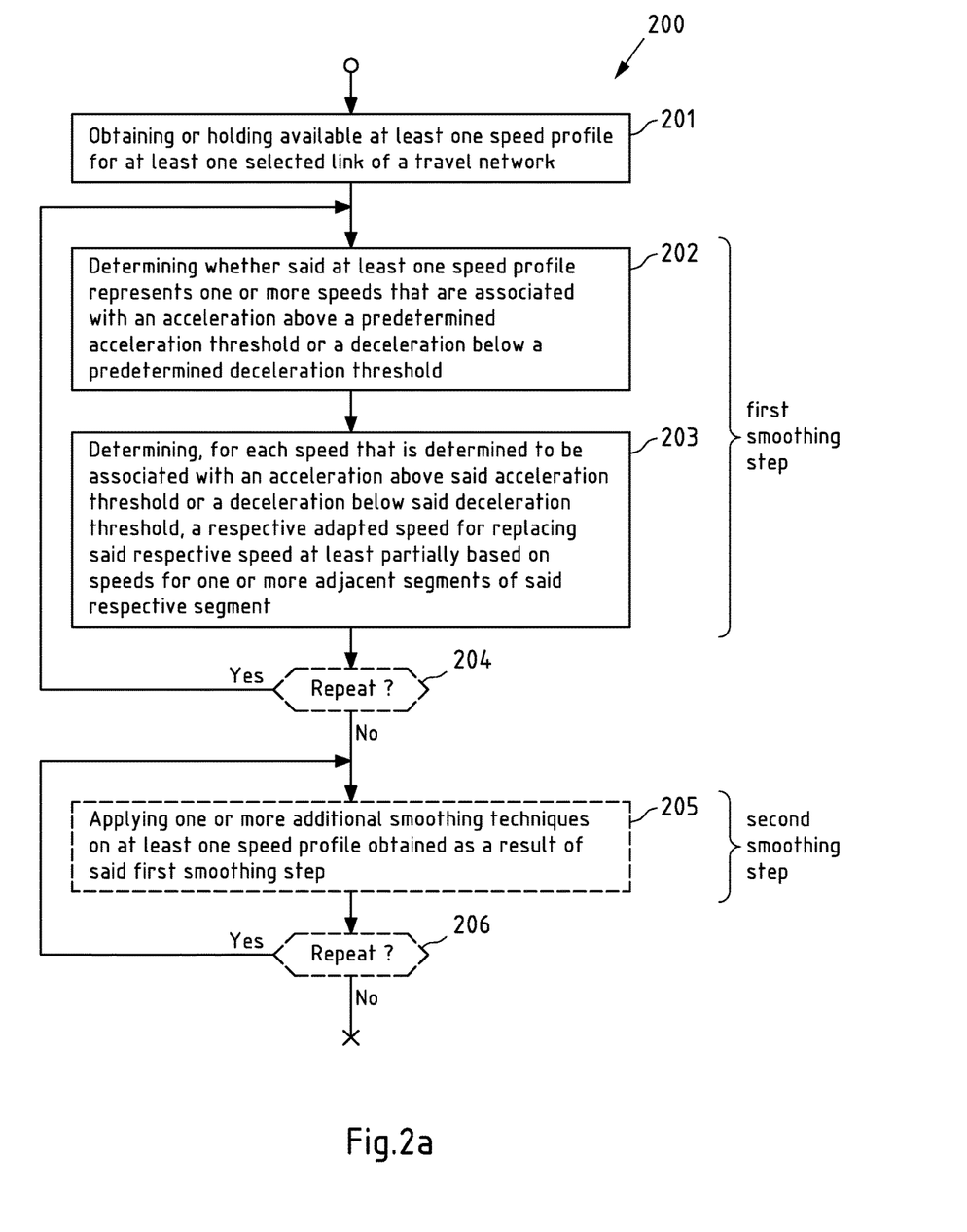
FIG. 2a-b are flowcharts of exemplary embodiments of a method according to the invention.

FIG. 2a is a flow chart 200 illustrating an exemplary embodiment of a method according to the invention. In the following, it is assumed that the steps of this flowchart 200 are performed by server 11 of system 10 of FIG. 1a.

In a step 201, server 11 obtains or holds available at least one speed profile for at least one selected link of a travel network. The speed profile may for example be stored in memory 102 of server 11. Furthermore, map data representing, at least in part, the travel network may be stored in memory 102. For example, the speed profile and the map data may be part of a navigation database stored in memory 102 of server 11. Alternatively or additionally, the speed profile and/or the map data may be determined by processor 101 of server 11.

The speed profile for the selected link represents a plurality of speeds for a plurality of subsequent segments of the selected link. The selected link may be divided into the plurality of subsequent segments having the same length (e.g. 10 m). The speed profile for the selected link may represent for each segment of this plurality of segments a respective speed (e.g. a speed percentile or a mean speed).

Figure 3A:
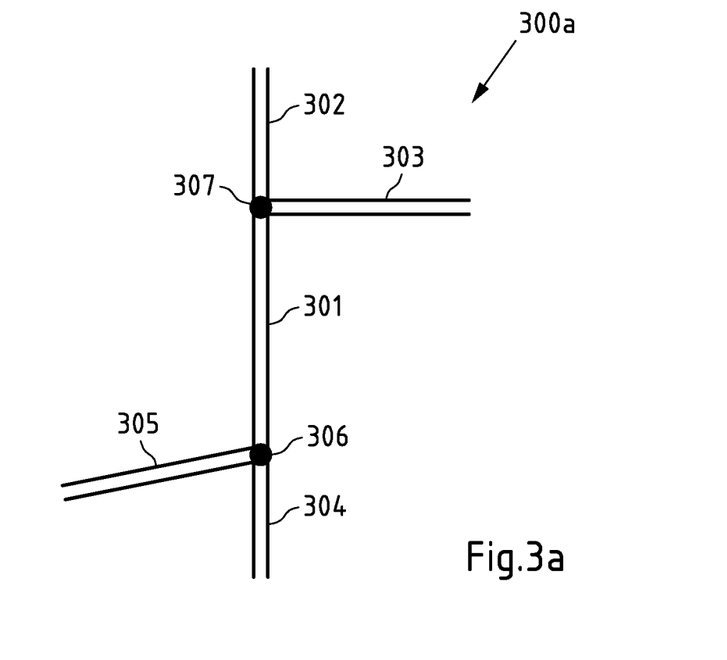
FIG. 3a is a illustration of at least a part of an exemplary travel network represented by map data.

FIG. 3a illustrates at least in part an exemplary travel network 300a represented by such map data. It comprises links 301, 302, 303, 304 and 305 and junctions 306 and 307. A link of travel network 300a may for example be understood to represent a section of the travel network which is between two junctions like link 301 which is between junctions 306 and 307.

The reference signs of the links may correspond to unique link identifiers associated with the links and a travel direction of the links may be indicated by the characters "T" or "F". Thus, link 301 may be identified by "301T" in one travel direction and by "301F" in the other travel direction.

Figure 3B:
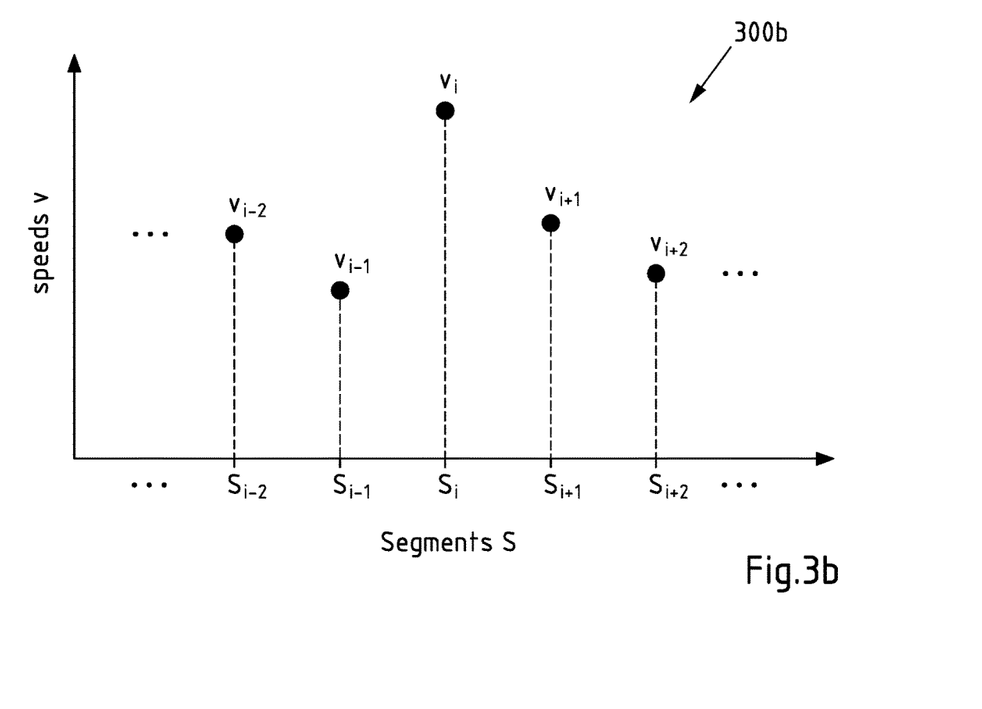
FIG. 3b-c are diagrams of a portion of an exemplary speed profile and a corresponding smoothed speed profile obtained by an exemplary embodiment of a method according to the invention.

In the following, it is assumed that link 301 is the selected link. A diagram of a portion of an exemplary speed profile 300b for link 301 is illustrated in FIG. 3b.

For example, link 301 may be divided into a plurality of n subsequent segments $S_1, \ldots S_{i-1}, S_i, S_{i+1}, \ldots S_n$, wherein each of the n subsequent segments has the same length L (e.g. L=10 m). The plurality of speeds of the speed profile 300b for link 301 may comprise for each segment of the plurality of n subsequent segments $S_1, \ldots S_{i-1}, S_i, S_{i+1}, \ldots S_n$ a respective speed v, wherein speed $v_{i-1}$ is for segment $S_{i-1}$, speed $v_i$ is for segment $S_i$, speed $v_{i+1}$ is for segment $S_{i+1}$, and so forth.

The following steps 202 and 203 are part of a first smoothing step for smoothing the at least one speed profile for the at least one selected link (e.g. speed profile 300b for selected link 301).

In a step 202, server 11 determines whether the at least one speed profile represents one or more speeds that are associated with an acceleration above a predetermined acceleration threshold or a deceleration below a predetermined deceleration threshold.

A speed for a segment of the plurality of subsequent segments of the selected link represented by the at least one speed profile may be determined to be associated with an acceleration above a predetermined acceleration threshold, if an acceleration between this speed and the speed for the previous segment for a given acceleration distance is above the predetermined acceleration threshold. Similarly, a speed for a segment of the plurality of subsequent segments of the selected link represented by the at least one speed profile may be determined to be associated with an deceleration below a predetermined acceleration threshold, if a deceleration between this speed and the speed for the previous segment for a given deceleration distance is below the predetermined deceleration threshold. For example, the length of the respective segment may be used as acceleration or deceleration distance.

The determining in step 202 may thus comprise calculating the acceleration or deceleration between subsequent speeds along the speed profile. In case of FIG. 3b, acceleration $a_i$ associated with speed $v_i$ for segment $S_i$ with length L may for example be calculated by:

$$a_i = \frac{v_i^2 - v_{i-1}^2}{2L}.$$

The acceleration $a_i$ associated with speed $v_i$ may then be compared with the predetermined acceleration threshold or the predetermined deceleration threshold. In the following, it is assumed that the absolute value of the predetermined acceleration threshold and the predetermined deceleration threshold is equal to $a_{threshold}$. Accordingly, speed $v_i$ is determined to be associated with an acceleration above a predetermined acceleration threshold or a deceleration below a predetermined deceleration if the following condition is met:

$$|a_i| > a_{threshold}.$$

An example predetermined acceleration threshold may be 0.3 g, 0.6 g or 0.8 g; and an example predetermined deceleration threshold may be −0.3 g, −0.6 g or −0.8 g (with g describing the standard value of the gravitational acceleration, i.e. 9.80665 m/s2). The predetermined acceleration and deceleration thresholds could be different to account for the fact that higher deceleration are achievable compared to accelerations.

In the following, it is exemplary assumed that acceleration $a_i$ associated with speed $v_i$ for segment $S_i$ is determined to be above the predetermined acceleration threshold $a_{threshold}$.

In a step 203, server 11 determines, for each speed that is determined to be associated with an acceleration above the acceleration threshold or a deceleration below the deceleration threshold, a respective adapted speed for replacing the respective speed at least partially based on speeds for one or more adjacent segments of the respective segment.

The respective adapted speed for replacing the respective speed may be determined by one of:
calculating a mean speed of the one or more speeds for the one or more adjacent segments,
calculating a weighted mean speed of the speeds for the one or more adjacent segments and the respective segment.

By way of example, calculating a mean speed as adapted speed $v_{i,adapted}$ for replacing speed $v_i$ of speed profile 300b of FIG. 3b is described in the following. For calculating adapted speed $v_{i,adapted}$, the speeds $v_{i-1}$ for segment $S_{i-1}$ and $v_{i+1}$ for segment $S_{i+1}$ may be used. Segments $S_{i-1}$ and $S_{i+1}$ are adjacent to segment $S_i$. Adapted speed $v_{i,adapted}$ may be calculated as mean speed of the speeds $v_{i-1}$ and $v_{i+1}$ as follows:

$$v_{i,adapted} = \frac{(v_{i-1} + v_{i+1})}{2}.$$

Subsequently, each speed that is determined to be associated with an acceleration above the acceleration threshold or a deceleration below the deceleration threshold in step 203, may be replaced by the respective adapted speed for replacing the respective speed.

As a result of the first smoothing step, a first smoothed speed profile may be obtained in which each speed that is determined to be associated with an acceleration above the acceleration threshold or a deceleration below the deceleration threshold is replaced by a respective adapted speed.

Figure 3C:
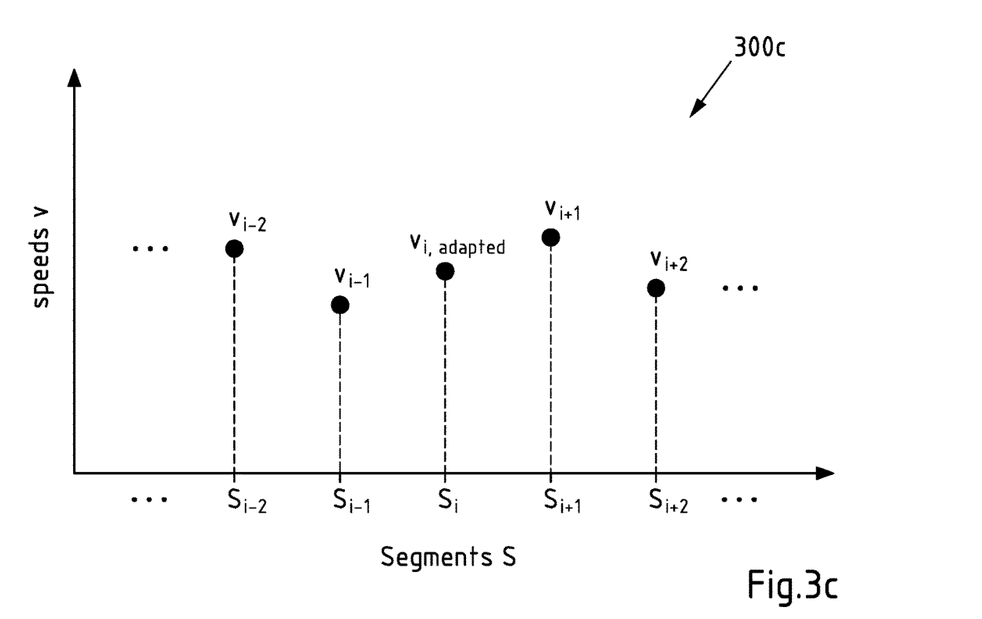

FIG. 3c illustrates an exemplary diagram of a portion of such a first smoothed speed profile 300c which corresponds to speed profile 300b of FIG. 3b. In first smoothed speed profile 300c, speed $v_i$ is replaced by adapted speed $v_{i,adapted}$.

In the first smoothing step, speeds determined to be associated with an acceleration above a predetermined threshold (e.g. >0.6 g) are thus removed and interpolated. This may have the effect that at least the worst outliers may be removed from the speed profile.

In an optional step 204, server 11 determines whether steps 202 and 203 are to be repeated. For example, the first smoothing step comprising steps 202 and 203 may be repeated at least twice.

In an optional step 205, server 11 applies one or more additional smoothing techniques on at least one speed profile (e.g. a first smoothed speed profile such as first smoothed speed profile 300c of FIG. 3c) obtained as a result of the first smoothing step. Step 205 may be part of a second smoothing step.

Different smoothing techniques may be used in step 205, for example one of the following smoothing techniques:
locally weighted scatterplot smoothing;
smoothing spline;
Friedman's super smoother;
rolling mean;
rounded splines.

As described in more detail above, for implementing these smoothing techniques, the "R" software of the R Project for Statistical Computing may be used at least in part. R is a free software environment for statistical computing and graphics. It is presently available from https://www.r-project.org.

In an optional step 206, server 11 determines whether step 205 is to be repeated. For example, the second smoothing step comprising step 205 may be repeated at least twice.

Speed profiles determined based on mean speeds or speed percentiles may be affected by statistical fluctuations. These fluctuations can be smoothed out by the above described smoothing steps. In the first smoothing step, large speed fluctuations between neighboring segments, corresponding to accelerations larger than a predetermined acceleration and deceleration threshold (e.g. 0.6 g), may be replaced by the average of the speeds in the neighboring segments. In the second smoothing step, the fluctuations are further suppressed using one or more additional smoothing techniques like the smoothing spline technique. If the speed profiles are smoothed individually, discontinuities may arise at the boundaries between subsequent links. In order to suppress such discontinuities, for each selected link, the smoothing may be executed along three subsequent links comprising the selected link and both links adjacent to the selected link. If multiple speed profiles exist for a link, then each speed profile may smoothed separately.

Figure 2B:
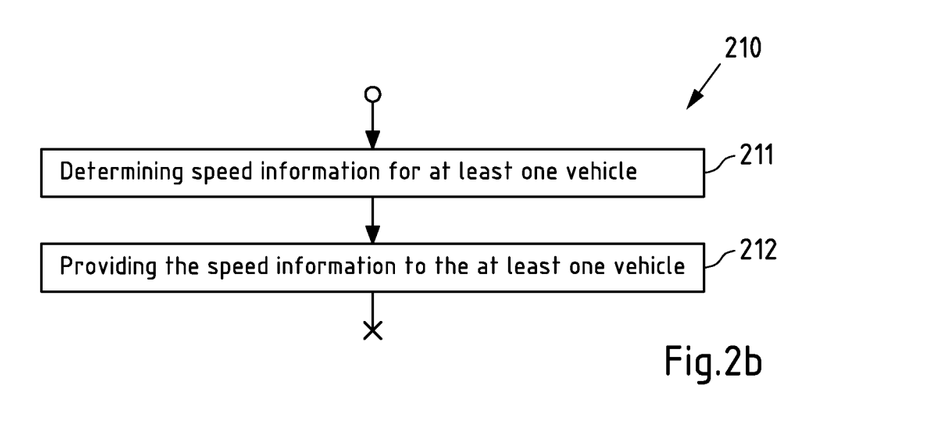

FIG. 2b is a flowchart 210 illustrating optional steps of the method according to the invention. The steps of flowchart 210 may for example be performed prior to or subsequent to the steps of flowchart 200 of FIG. 2a. In the following, it is assumed that the steps of this flowchart 210 are performed by server 11 of system 10 of FIG. 1a. Alternatively or additionally, the steps of this flowchart may be at least partially performed by vehicle 12 of system 10 of FIG. 1a.

In step 211, server 11 determines speed information for vehicle 12. For example, the speed information may at least partially represent at least one smoothed speed profile obtained as a result of the first or second smoothing step described with respect to FIG. 2a above.

For example, server 11 may receive a request for determining speed information for a travel route from vehicle 12. The request may specify the links or potential travel paths included in the travel route.

The speed information for vehicle 12 may be determined to represent the smoothed speed profiles for the links that are included in the travel route.

By way of example, the speed information may represent smoothed speed profiles at which despite the automotive capabilities of vehicle 12 in terms of speed, acceleration, braking, etc., a user may still feel comfortable and safe within the vehicle while traveling and/or the vehicle may interact safely with one or more other vehicles on the same route.

In step 212, server 11 may provide the speed information to vehicle 12. For example the speed information may be communicated from server 11 to vehicle 12.

Vehicle 12 may use the speed information for, at least in part, autonomously driving along the travel route. The speed information may cause vehicle 12 to at least partially control and/or adapt its speed accordingly when driving along the route represented by the travel route information.

Figure 4:
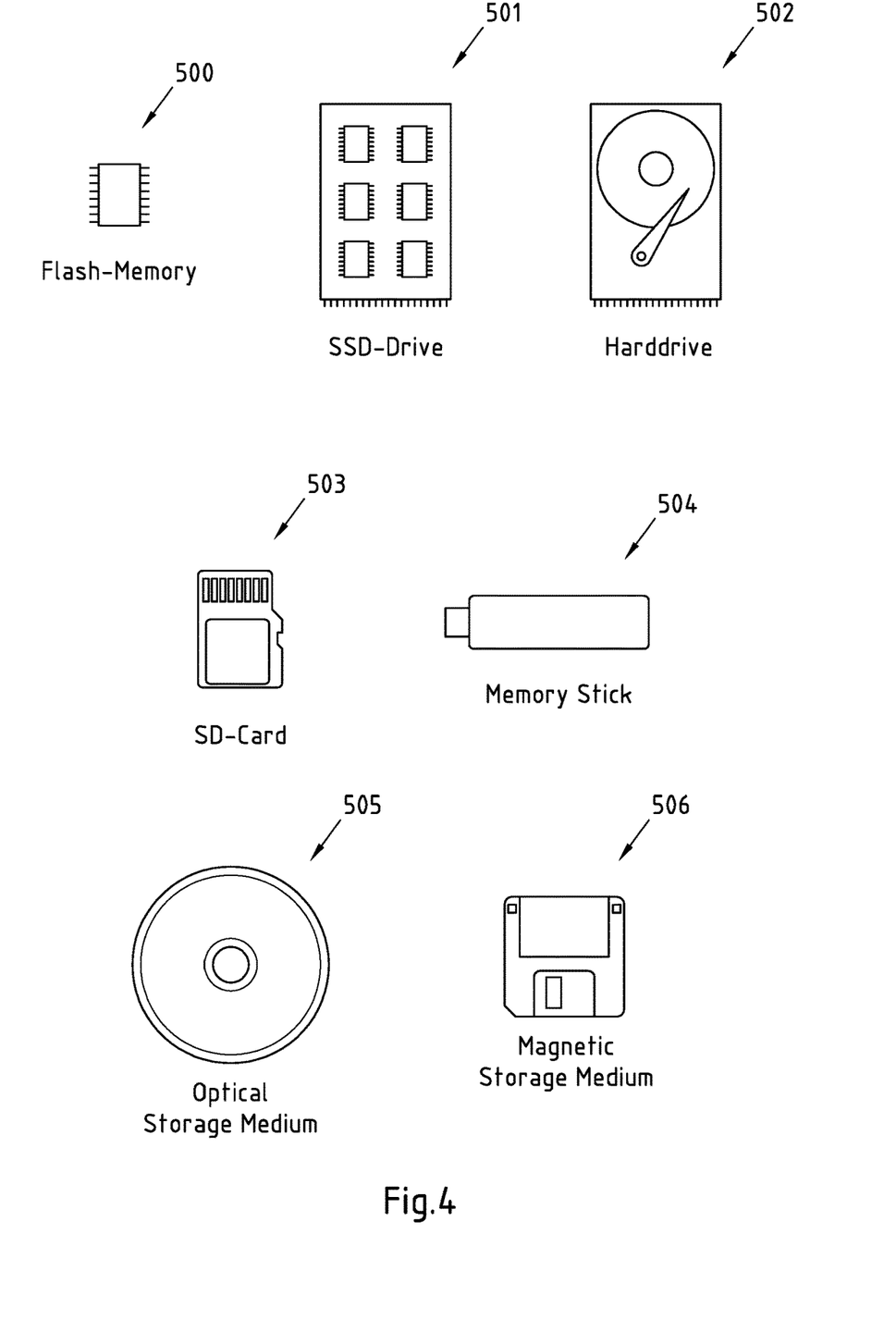
FIG. 4 is a schematic illustration of examples of tangible and non-transitory storage media according to the present invention.

FIG. 4 is a schematic illustration of examples of tangible and non-transitory computer-readable storage media according to the present invention that may for instance be used to implement program memory 102 of FIG. 1. To this end, FIG. 4 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes, steps and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, said method comprising:
obtaining or holding available at least one speed profile for at least one selected link of a travel network, wherein said at least one speed profile represents a plurality of speeds for a plurality of subsequent segments of said selected link;
smoothing said at least one speed profile for said at least one selected link in a first smoothing step by:
determining whether said at least one speed profile represents one or more speeds that are associated with an acceleration above a predetermined acceleration threshold or a deceleration below a predetermined deceleration threshold;
for each speed that is determined to be associated with an acceleration above said acceleration threshold or a deceleration below said deceleration threshold, determining a respective adapted speed for replacing said respective speed at least partially based on speeds for one or more adjacent segments of said respective segment; and
causing at least partial control of a vehicle according to the at least one speed profile after smoothing.

2. The method according to claim 1, wherein said respective adapted speed for replacing said respective speed is determined by one of:
calculating a mean speed of the speeds for the one or more adjacent segments,
calculating a weighted mean speed of the speeds for the one or more adjacent segments.

3. The method according to claim 1, said smoothing in a second smoothing step further comprising:
applying one or more additional smoothing techniques on at least one speed profile obtained as a result of said first smoothing step.

4. The method according to claim 3, wherein said one or more additional smoothing techniques are one of:
locally weighted scatterplot smoothing;
smoothing spline;
Friedman's super smoother;
rolling mean;
rounded splines.

5. The method according to claim 1, wherein said first smoothing step is repeated at least twice.

6. The method according to claim 1, wherein in said first smoothing step one or more further speed profiles for one or more links adjacent to said selected link are at least partially considered.

7. The method according to claim 6, wherein said selected link and said one or more links adjacent to said selected link represent three or more subsequent links.

8. The method according to claim 6, wherein said selected link and said one or more links adjacent to said selected link represent a potential travel path for said selected link, wherein said potential travel path for said at least one selected link is at least partially defined by an incoming link of said travel network and an outgoing link of said travel network that are linked by said selected link and a direction of travel from said incoming link to said outgoing link on said selected link.

9. The method according to claim 1, said method further comprising:
   determining said at least one speed profile for said selected link of said travel network at least partially based on speeds represented by a plurality of probe data points of one or more probe data sets of a plurality of probe data sets.

10. The method according to claim 1, said method further comprising:
    providing or generating speed map data representing an association of map data and a plurality of speed profiles for links of said travel network, said plurality of speed profiles comprising at least one smoothed speed profile obtained as a result of said smoothing.

11. The method according to claim 1, said method further comprising:
    determining speed information for at least one vehicle;
    providing said speed information to said at least one vehicle.

12. The method of claim 1, wherein causing at least partial control of a vehicle according to the at least one speed profile after smoothing comprises causing at least partial autonomous control of a vehicle according to the at least one speed profile after smoothing as the vehicle travels along the at least one selected link.

13. The method according to claim 1, wherein said method is performed for a plurality of links of said travel network as selected link.

14. An apparatus comprising at least one processor and at least one memory including computer program code for one or more programs, the at least one memory and the computer program code configured to, with the at least one processor, cause the apparatus at least to:
    obtain or hold available at least one speed profile for at least one selected link of a travel network, wherein said at least one speed profile represents a plurality of speeds for a plurality of subsequent segments of said selected link;
    smooth said at least one speed profile for said at least one selected link in a first smoothing step by:
        determining whether said at least one speed profile represents one or more speeds that are associated with an acceleration above a predetermined acceleration threshold or a deceleration below a predetermined deceleration threshold;
        for each speed that is determined to be associated with an acceleration above said acceleration threshold or a deceleration below said deceleration threshold, determining a respective adapted speed for replacing said respective speed at least partially based on speeds for one or more adjacent segments of said respective segment; and
    cause at least partial control of a vehicle according to the at least one speed profile after smoothing.

15. The apparatus according to claim 14, wherein said respective adapted speed for replacing said respective speed is determined by one of:
    calculating a mean speed of the speeds for the one or more adjacent segments,
    calculating a weighted mean speed of the speeds for the one or more adjacent segments.

16. The apparatus according to claim 14, said smoothing in a second smoothing step further comprising:
    applying one or more additional smoothing techniques on at least one speed profile obtained as a result of said first smoothing step.

17. The apparatus according to claim 16, wherein said one or more additional smoothing techniques are one of:
    locally weighted scatterplot smoothing;
    smoothing spline;
    Friedman's super smoother;
    rolling mean;
    rounded splines.

18. The apparatus according to claim 14, wherein said first smoothing step is repeated at least twice.

19. The apparatus according to claim 14, wherein in said first smoothing step one or more further speed profiles for one or more links adjacent to said selected link are at least partially considered.

20. The apparatus according to claim 19, wherein said selected link and said one or more links adjacent to said selected link represent three or more subsequent links.

21. The apparatus according to claim 19, wherein said selected link and said one or more links adjacent to said selected link represent a potential travel path for said selected link, wherein said potential travel path for said at least one selected link is at least partially defined by an incoming link of said travel network and an outgoing link of said travel network that are linked by said selected link and a direction of travel from said incoming link to said outgoing link on said selected link.

22. The apparatus according to claim 14, said apparatus further caused to:
    determine said at least one speed profile for said selected link of said travel network at least partially based on speeds represented by a plurality of probe data points of one or more probe data sets of a plurality of probe data sets.

23. The apparatus according to claim 14, said apparatus further caused to:
    provide or generate speed map data representing an association of map data and a plurality of speed profiles for links of said travel network, said plurality of speed profiles comprising at least one smoothed speed profile obtained as a result of said smoothing.

24. The apparatus according to claim 14, said apparatus further caused to:
    determine speed information for at least one vehicle;
    provide said speed information to said at least one vehicle.

25. The apparatus according to claim 24, wherein said at least one vehicle is, at least in part, an autonomous vehicle, a highly-assisted-driving vehicle, a vehicle with predictive cruise control, or a combination thereof.

26. The apparatus according to claim 14, wherein said apparatus is part of:
    an embedded navigation device of a vehicle.

27. A non-transitory computer readable storage medium including one or more sequences of one or more instructions which, when executed by one or more processors, cause an apparatus to at least perform:
    obtaining or holding available at least one speed profile for at least one selected link of a travel network, wherein said at least one speed profile represents a plurality of speeds for a plurality of subsequent segments of said selected link;
    smoothing said at least one speed profile for said at least one selected link in a first smoothing step by:
        determining whether said at least one speed profile represents one or more speeds that are associated with an acceleration above a predetermined acceleration threshold or a deceleration below a predetermined deceleration threshold;

for each speed that is determined to be associated with an acceleration above said acceleration threshold or a deceleration below said deceleration threshold, determining a respective adapted speed for replacing said respective speed at least partially based on speeds for one or more adjacent segments of said respective segment; and causing at least partial control of a vehicle according to the at least one speed profile after smoothing.

\* \* \* \* \*